United States Patent [19]

Shimizu et al.

[11] Patent Number: 4,462,663
[45] Date of Patent: Jul. 31, 1984

[54] CONVERGING LIGHT TRANSMITTING BODY OF HIGH PERFORMANCE AND PROCESS FOR PRODUCTION THEREOF

[75] Inventors: Masayoshi Shimizu, Suita; Takashi Yamagishi, Itami; Yukio Noguchi, Toyonaka, all of Japan

[73] Assignee: Nippon Sheet Glass Co., Ltd., Osaka, Japan

[21] Appl. No.: 290,965

[22] Filed: Aug. 7, 1981

[30] Foreign Application Priority Data

Aug. 11, 1980 [JP] Japan .................... 55-109982

[51] Int. Cl.³ .................... C03C 3/08; G02B 5/14
[52] U.S. Cl. .................... 350/413; 350/96.31
[58] Field of Search .................... 350/413, 96.31

[56] References Cited

U.S. PATENT DOCUMENTS 3,647,406  3/1972  Fisher .................... 350/96.31
3,859,103  1/1975  Yoshiyagawa et al. .................... 350/96.31
3,941,474  3/1976  Kitano et al. .................... 350/96.31

Primary Examiner—John K. Corbin
Assistant Examiner—Rebecca D. Gass
Attorney, Agent, or Firm—Wenderoth, Lind & Ponack

[57] ABSTRACT

The present invention provides a converging light transmitting glass body whose refractive index gradually changes from its central portion to its surface in a direction transverse to a path of light, said glass body containing at least three cations constituting modifying oxides of the glass, a first and a second cation among said cations showing concentration changes of converse gradients from its central portion toward its peripheral surface, and a third cation showing no substantial concentration change at the central portion of the glass body but showing a substantial continuous concentration charge outwardly thereof toward its peripheral surface.

The present invention also provides a process for producing the light transmitting glass body which comprises contacting a glass body containing a modifying oxide of a first cation with an ion source containing the second cation to produce a pre-produced glass body, and then contacting the pre-produced glass body with an ion source containing the third cation, or which comprises contacting a glass body containing a modifying oxide of a first cation with an ion source containing a second cation and a third cation.

The converting light transmitting glass body of the present invention has an ideal refractive index distribution.

6 Claims, 6 Drawing Figures

CONVERGING LIGHT TRANSMITTING BODY OF HIGH PERFORMANCE AND PROCESS FOR PRODUCTION THEREOF

BACKGROUND OF THE INVENTION

This invention relates to a converging light transmitting glass body whose refractive index gradually changes in a direction transverse to a light path, and to a process for production thereof.

It has already been elucidated that a converging light transmitting glass body whose refractive index gradually changes from its center toward its surface in a direction transverse to a light path, and which has an ideal refractive index distribution showing an ideal change in refractive index from its center to its surface, namely an ideal refractive index that imparts a distortion-free lens action from its center to its surface has the following relation $$N(r) = N_o \operatorname{sech}\left(\sqrt{A}\, r\right) \quad (1)$$

wherein A is a refractive index distribution constant, and in an arbitrary phantom cross section of the light transmitting body taken at right angles to the light path, $N_o$ is the refractive index at the central point of the cross section, and $N(r)$ is the refractive index at a distance r from the central point, with regard to meridional rays, and the following relation $$N(r) = N_o(1 + A \cdot r^2)^{-\frac{1}{2}} \quad (2)$$

wherein all symbols are as defined, with regard to helical rays [see a Japanese-language publication, "Optical Technology Contact", vol. 16, No. 5, pages 25–37, an article written by Kooichi Nishizawa and entitled "Selfoc Lens and Application Thereof"].

If the equations (1) and (2) are polynomially expanded, they can be written as follows:

$$N(r) = N_o \operatorname{sech}\left(\sqrt{A}\, r\right) = \quad (1)'$$

$$N_o\left\{1 - \frac{A}{2}\cdot r^2 + \frac{5}{6}\left(\frac{A}{2}\right)^2 \cdot r^4 - \frac{61}{90}\left(\frac{A}{2}\right)^3 \cdot r^6 + \ldots\right\}$$

(with regard to meridional rays).

$$N(r) = N_o(1 + A \cdot r^2)^{-\frac{1}{2}} = \quad (2)'$$

$$N_o\left\{1 - \frac{A}{2}\cdot r^2 + \frac{3}{2}\left(\frac{A}{2}\right)^2 \cdot r^4 - \frac{5}{2}\left(\frac{A}{2}\right)^3 \cdot r^6 + \ldots\right\}$$

(with regard to helical rays).

A converging light transmitting glass body has previously been known which has a refractive index gradually changing from its center to its surface (see U.S. Pat. No. 3,941,474). This light transmitting body has the following relation $$N(r) = N_o\left(1 - \frac{A}{2}\cdot r^2\right) \quad (3)$$

wherein in a phantom cross section taken at right angles to the path of light, $N_o$ is the refractive index at the central point of the cross section, and $N(r)$ is the refractive index at a distance r from the central point.

A comparison of equation (3) with equations (1)' and (2)' shows that this light transmitting body has a refractive index approximate to a light transmitting body having an ideal refractive index distribution, but it still never has the ideal refractive index. Specifically, the above known light transmitting body shows refractive indices well corresponding with a light transmitting body having an ideal refractive index distribution in areas located at a small distance r from the central portion of the light transmitting body, but as the distance r from the central point increases (i.e., nearer to the peripheral surface portion), the known light transmitting body shows a smaller refractive index than the refractive index of the light transmitting body having the ideal refractive index distribution.

Because of having the aforesaid refractive index distribution, the conventional light transmitting body has the following two points to be improved for practical application.

Firstly, it has the defect that since it shows a refractive index remote from the refractive index of the light transmitting body having an ideal refractive index distribution as it departs from the central portion, transmission of light information becomes obscure and lacks accuracy. In order to remedy this defect, it is the practice to utilize the central portion of the light transmitting body which has a refractive index distribution close to the ideal refractive index distribution. Applications in which the light transmitting body can be used in this way are naturally limited, and the efficiency of utilization is reduced as a matter of course.

Because of the aforesaid refractive index distribution, conventional light transmitting bodies will not fully withstand use in applications which require high performance and have been actively developed in recent years, such as optical detecting devices for videodiscs, optical image viewing devices (e.g., an arthroscope), and various optical communication devices.

Secondly, since the conventional light transmitting bodies show a smaller refractive index than the index of a light transmitting body having an ideal refractive index distribution as they depart from the central portion, light which has passed through the peripheral portion of the light transmitting bodies is converged more inwardly (viewed from the direction in which the light advances) on the central axis than the light which has passed through a relatively central portion of the light transmitting bodies. It is noted that since light transmitting bodies are generally in the form of a very fine filament, formation of a convex shape is the only available technique for compensating for aberration, i.e. a deviation in the position of a focal point on the central axis by processing the end face of the light transmitting bodies. However, when the conventional light transmitting bodies having a smaller refractive index than the refractive index of the light transmitting body having an ideal refractive index distribution as they depart from the central portion has an increased aberration when processed into a convex shape.

SUMMARY OF THE INVENTION

It is an object of this invention therefore to provide a converging light transmitting glass body having a refractive index distribution very close to that of a light transmitting body having an ideal refractive index distribution even in a peripheral surface portion of the light transmitting body apart from its central portion.

Another object of this invention is to provide a converging light transmitting glass body which has an ideal refractive index distribution at its central portion and a refractive index larger than the ideal refractive index in its peripheral surface portion, and therefore permit compensation of aberration by forming a convex surface on the end surface.

Still another object of this invention is to provide a converging light transmitting glass body having the aforesaid refractive index distribution characteristics by changing the concentrations of at least three cations constituting a modifying oxide of glass from its central portion to its peripheral surface portion.

A further object of this invention is to provide a process for producing the aforesaid converging light transmitting glass body.

Other objects and advantages of this invention will become more apparent from the following description.

According to this invention, these objects and advantages of the invention are achieved by a converging light transmitting glass body whose refractive index gradually changes from its central portion to its surface in a direction transverse to a path of light, said glass body containing at least three cations constituting modifying oxides of the glass, a first and a second cation among said cations showing concentration changes of converse gradients from its central portion toward its peripheral surface, and a third cation showing no substantial concentration change at the central portion of the glass body but showing a substantial continuous concentration change outwardly thereof toward its peripheral surface.

According to this invention, such a light transmitting glass body can be produced by a process which comprises contacting a glass body containing a modifying oxide of a first cation with an ion source containing a second cation capable of constituting a modifying oxide of the glass body to produce a pre-produced glass body in which the first cation and the second cation show substantially continuous concentration changes of converse gradients from the central portion to the peripheral portion of the glass body, and then contacting the preproduced glass body with an ion source containing a third cation capable of constituting a modifying oxide of the glass body to produce a glass body in which the third cation does not show a concentration change in the central portion but shows a substantially continuously changing concentration toward the peripheral portion.

DETAILED DESCRIPTION OF THE INVENTION

Examples of the first, second and third cations used in the process of this invention include monovalent cations such as lithium ($L^+$), sodium ($Na^+$), potassium ($K^+$), rubidium ($Rb^+$), cesium ($Cs^+$) and thallium ($Tl^+$); divalent cations such as magnesium ($Mg^{++}$), calcium ($Ca^{++}$), strontium ($Sr^{++}$), barium ($Ba^{++}$), zinc ($Zn^{++}$) and lead ($Pb^{++}$); trivalent cations such as lanthanum ($La^{+++}$); and tetravalent cations such as tin ($Sn^{++++}$). Among them, the monovalent cations are preferred in the process of this invention because they can be diffused in the glass at lower temperatures than the divalent to tetravalent cations.

The process of the invention is carried out first by contacting a glass body containing a modifying oxide of a first cation with an ion source containing a second cation to form a pre-produced glass body, and then contacting the pre-produced glass body with an ion source containing a third cation.

In the first step of the process of this invention, a part of the first cation in the glass body is substituted by the second cation to give a pre-produced glass body in which the first cation and the second cation show substantially continuous concentration changes of converse gradients from the central portion toward the peripheral portion of the glass body. Specifically, the first cation shows a progressively decreasing concentration from the central portion of the glass body toward its peripheral surface, and the second cation shows a progressively increasing concentration change from the central portion of the glass body toward its peripheral surface.

Thus, in the first step of the process of the invention, the second cation is diffused through the glass body and taken into the glass body upon being substituted by the first cation. The first ion which is substituted by the second cation is similarly diffused within the glass body and forced out of the glass body into the ion source containing the second cation.

Then, the pre-produced glass body is contacted with an ion source containing the third cation. In the second step, a part of the first cation and/or the second cation in the pre-produced glass body is substituted by the third cation to give a glass body in which the third cation does not substantially show a change in concentration at the central portion of the glass body, but shows a substantially continuously changing concentration toward the peripheral surface portion. Specifically, the third ion shows a substantially progressively decreasing concentration from the peripheral surface of the glass body toward its central portion, and at the central portion, there is no substantial change in concentration.

In order to produce a final glass body in which the third cation shows the aforesaid concentration change, the contacting of the pre-produced glass body with the ion source containing the third cation is controlled in relation to the contacting temperature and time. Such a contacting time and temperature can be determined experimentally.

The first and second steps of the process of this invention can be performed by dipping the glass body at high temperatures in an ion source containing the corresponding second and third cations, for example a molten bath of at least one salt such as nitrates, sulfates, etc. of the corresponding cations.

The contacting temperature is below the softening temperature of the glass, preferably between the transformation point of the glass body and its strain point.

The process of this invention may be carried out by taking out the pre-produced glass body obtained in the first step from the treating bath in the first step and then treating it in a treating bath containing the third cation in the second step; or by treating the pre-produced glass body obtained in the first step in a treating bath of the second step prepared by adding a source of the third cation to the treating bath of the first step.

The manner of contribution of the cations of the modifying oxides of the glass to its refractive index generally differs depending upon the type of the glass body as a matrix and the types of the cations.

The qualitative effect of the presence of a certain ion on the refractive index of glass can generally be determined by comparing the values of electronic polarization per unit volume within the glass of the related ions, or the values of electronic polarizability/(ion radius)$^3$.

Typical cations constituting modifying oxides of glass have the ion radii, electronic polarizability and ratio of electronic polarizability to (ion radius)$^3$ shown in Table 1.

TABLE 1

| Ion | Ion radius (Å) | Electronic polarizability (Å$^3$) | Electronic polarizability (ion radius)$^3$ |
|---|---|---|---|
| Li$^+$ | 0.78 | 0.03 | 0.0632 |
| Na$^+$ | 0.95 | 0.41 | 0.478 |
| K$^+$ | 1.33 | 1.33 | 0.565 |
| Rb$^+$ | 1.49 | 1.98 | 0.599 |
| Cs$^+$ | 1.65 | 3.34 | 0.744 |
| Tl$^+$ | 1.49 | 5.2 | 1.572 |
| Mg$^{+2}$ | 0.78 | 0.094 | 0.20 |
| Ca$^{+2}$ | 0.99 | 1.1 | 1.13 |
| Sr$^{+2}$ | 1.27 | 1.6 | 0.78 |
| Ba$^{+2}$ | 1.43 | 2.5 | 0.85 |
| Zn$^{+2}$ | 0.83 | 0.8 | 1.39 |
| Cd$^{+2}$ | 1.03 | 1.8 | 1.71 |
| Pb$^{+2}$ | 1.32 | 4.9 | 2.11 |
| La$^{+3}$ | 1.22 | 1.04 | 5.68 |
| Sn$^{+4}$ | 0.74 | 3.4 | 8.35 |

For example, Table 1 qualitatively teaches that glass in which Na$^+$ is a cation constitutes a modifying oxide will have a smaller refractive index than glass in which K$^+$ is a cation constituting a modifying oxide. It also teaches qualitatively that a glass body can be produced in which Na$^+$ and K$^+$ are cations constituting a modifying oxide, the concentration of K$^+$ decreases from the central portion to the peripheral portion of the glass body and the concentration of Na$^+$ increases from the central portion to the peripheral portion. Such a glass body would have a gradually decreasing refractive index from the central portion to the peripheral portion of the glass body.

By considering the data shown in Table 1 relatively, it is possible to presume qualitatively what ions should be selected as the first to third cations in the process of this invention.

In the process of this invention, a thallium ion is most preferred as the first cation, a potassium ion as the second cation, and a cesium ion as the third cation.

The process of this invention can produce a light transmitting body in which the concentration of the third cation changes in a region corresponding to a distance from the peripheral surface of 10 to 70, preferably 30 to 50, if the distance between the peripheral surface and the center of the glass transmitting body is taken as 100. A light transmitting body having the desirable concentration distribution of the cations can be easily produced by the process of this invention by controlling the treating temperature and time although it varies depending upon the types of the first to third cations. Specific procedures would be clear from the descriptions of Examples to be given hereinbelow.

According to this invention, the light transmitting body of the invention can also be produced by contacting a glass body containing a modifying oxide of a first cation with an ion source containing a second cation and a third cation capable of constituting modifying oxides of the glass body.

This process can afford a light transmitting body in which the concentration of the first cation gradually decreases from the central portion to the peripheral surface of the light transmitting body, and the third cation does not substantially show a change in concentration at the central portion but shows a continuous concentration change toward the peripheral surface portion.

According to this second process, the glass body containing the first cation is treated in a bath of an ion source containing both the second and third cations. Accordingly, in order for the individual cations to have the aforesaid concentration distributions, it is necessary to consider, to the extent necessary, the difference in the speed of diffusion between the second cation and the third cation in the glass body, or the concentrations of the second cation and the third cation in the treating bath.

Suitable treating conditions in practice can be determined by repeated experiments. Specific treating conditions will be apparent from the descriptions of the Examples to be given hereinbelow. It has been found that in the second process, too, it is preferable to use a thallium ion, a potassium ion and a cesium ion as the first to third cations, respectively.

According to a third process of the invention, the light transmitting body of the invention can be produced by contacting a glass body containing a modifying oxide of the first cation and a modifying oxide of the third cation with an ion source containing the second source capable of constituting a modifying oxide of the glass body.

The third process of the invention can afford a light transmitting body in which the concentration of the first cation gradually decreases from the central portion to the peripheral portion, the concentration of the second cation gradually increases from the central portion toward the peripheral portion, and the third cation shows no substantial change in concentration at the central portion but shows a gradually decreasing concentration toward the peripheral surface.

This type of light transmitting body is produced when the second cation has a higher ratio of contribution to the refractive index near the peripheral surface of the light transmitting body than the third cation. For example, when the first cation is a thallium ion, the second cation is a potassium ion, and the third cation is a lithium ion, a light transmitting body having these cations contained in the aforesaid concentration distributions can be advantageously produced by the third process of the invention.

Thus, according to this invention, there is provided a converging light transmitting glass body whose refractive index gradually changes from its central portion to its surface in a direction transverse to a path of light, said glass body containing at least three cations constituting modifying oxides of the glass, a first and a second cation among said cations showing concentration changes of converse gradients from its central portion toward its peripheral surface, and a third cation showing no substantial concentration change at the central portion of the glass body but showing a substantial continuous concentration change outwardly thereof toward its peripheral surface.

That the "first cation and the second cation show concentration changes of converse gradients" means that for example, the first cation has a concentration change of decreasing tendency on the whole from the central portion toward the peripheral portion whereas the second cation has a concentration change of increasing tendency on the whole from the central portion toward the peripheral portion, or the two cations have concentration changes of converse tendencies. It should be understood that the "concentration change of increasing tendency on the whole" includes cases where a conncentration change of decreasing tendency exists partly in a concentration change of increasing tendency.

Preferably, the light transmitting body of the invention is such that the concentration of the first cation increases from the surface toward the center, the concentration of the second cation decreases from the surface toward the center, and the concentration of the third cation decreases from the surface to the center. As far as the distribution of the third cation is concerned, the light transmitting body of the invention is such that the concentration of the third cation changes in a region corresponding to a distance from the peripheral surface of preferably 10 to 70, more preferably from 30 to 50, if the distance between the peripheral surface and the center of the light transmitting body is taken as 100.

As regards the types of the first to third cations, the light transmitting body of the invention consists of a thallium ion as the first cation, a potassium ion as the second ion and a cesium ion as the third cation.

Investigations of the present inventors have shown that the light transmitting body of the invention has a refractive index distribution having the following relation with respect to meridional rays $$N(r) \cong N_o \operatorname{sech}\left(\sqrt{A}\, r\right)$$

wherein A is a refractive index distribution constant, and in an arbitrary phantom cross section of the light transmitting body taken at right angles to the light path, $N_o$ is the refractive index at the central point of the cross section, and $N(r)$ is the refractive index at a distance r from the central point, and a refractive index distribution having the following relation with respect to helical rays $$N(r) \cong N_o(1+A \cdot r^2)^{-\frac{1}{2}}$$

wherein all symbols are as defined.

In other words, according to this invention, there is provided a light transmitting body which gives optical characteristics substantially equivalent to a light transmitting body having an ideal refractive index distribution with respect to both meridional rays and helical rays as can be seen from Examples to be given hereinbelow.

Furthermore, according to this invention, there is provided a light transmitting body which has a larger refractive index at the peripheral portion than a light transmitting body having an ideal refractive index distribution with respect to both meridional rays and helical rays as can be seen from the Examples given hereinbelow. This type of light transmitting body can be easily converted to a light transmitting body capable of giving optical characteristics substantially equivalent to a light transmitting body having an ideal refractive index by forming a convex surface at the light-receiving end face and/or light-emitting end face of the light transmitting body, for example by directly grinding and polishing the end surface into a convex surface of a predetermined curvature, or by finishing the end surfaces of the light transmitting body in a planar shape and bonding to the planar surface a lens made of ordinary glass having no refractive index distribution and being made in a convex shape on one surface and in a planar shape on the other.

The converging light transmitting glass body of the invention has optical characteristics close to those of ideal lens, and therefore can be used in various applications in which conventional converging light transmitting bodies cannot be used. For example, for use in an optical detecting device of a videodisc which is required to focus a laser beam to an extremely minute point, a conventional converging light transmitting body can be used effectively only in a ratio of about 60% of its diameter, whereas the light transmitting body of the invention can be effectively used in its entirety. Since the amount of the laser beam that can be used effectively is proportional to the square of the effective diameter, this means that while in the conventional light transmitting body, the ratio of utilization of the laser beam is only 30 to 40%, the utilization ratio was increased to more than 90% in the light transmitting body of the invention.

The refractive index distribution of the light transmitting body of the invention can be controlled to a higher value than the ideal value,; that is, the refractive distribution curve can be made more gentle than the ideal distribution curve. Hence, by forming a convex surface on the end of the light transmitting body, lens aberration due to a difference in refractive index from the ideal distribution in the peripheral surface portion can be corrected. At the same time, a larger angle of aperture can be obtained than conventional light transmitting bodies whose end surfaces are flat.

Generally, the converging light transmitting body of the invention has a circular cross section and has the aforesaid refractive index distribution in the radial direction from its central axis. The light transmitting body of the invention can also be provided as a parallelepiped structure in which the aforesaid refractive index distribution exists in one direction of a cross section perpendicular to two parallel surfaces, and in a cross section in a direction at right angle to the aforesaid one direction, the refractive index is uniform and light rays are converged on one line.

Usually, the light-receiving and light-emitting surfaces of the light transmitting body of the invention are polished.

As stated hereinbefore, the light transmitting body of the invention exhibits much better optical properties than the conventional light transmitting bodies.

The following examples illustrate the present invention in more detail.

EXAMPLE 1 AND COMPARATIVE EXAMPLE 1

A round glass rod having a diameter of 1.0 mm produced from glass consisting of 58.2 mole% of $SiO_2$, 19.3 mole% of $B_2O_3$, 13.7 mole% of $Na_2O$, 5.8 mole% of $Tl_2O$ and 3.0 mole% of ZnO was pre-treated by maintaining it for 11 hours in a potassium nitrate bath kept at 510° C. The pre-treated round glass rod was maintained for 24 hours in a bath kept at 510° C. of a mixture of 99% by weight of potassium nitrate and 1% by weight of cesium nitrate. The treated glass rod was taken out from the bath, and its refractive index distribution was measured. The results are shown in Table 2.

For comparison, a round glass rod having a diameter of 1.0 mm produced from glass having the same composition as above was treated by a conventional treating method. Specifically, it was maintained for 35 hours in a potassium nitrate bath kept at 510° C. The refractive index distribution of the treated glass rod was determined, and is shown in Table 2.

Table 2 also shows $N_o$ sech ($\sqrt{A}$ r) values calculated for the distances r (mm) from the central axis of the treated glass rod ($A = 0.194$ mm$^{-2}$, $N_o = 1.580$).

Figure 1:
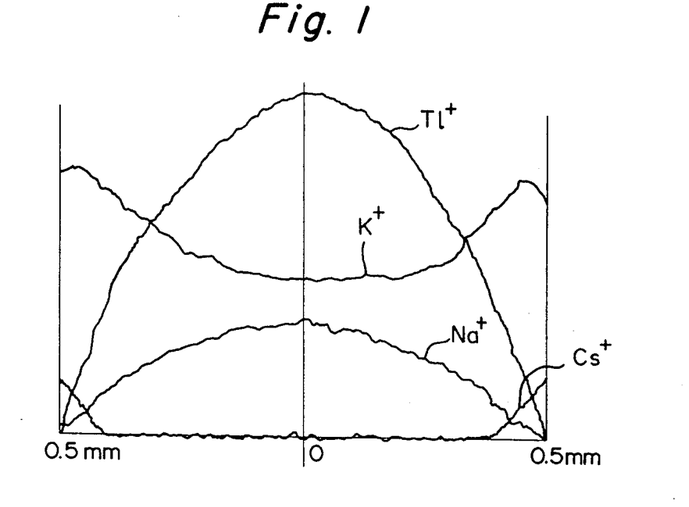
FIGS. 1 to 6 show variations in the concentration of three cations which constitute modifying oxides of the converging light transmitting glass body of the invention in a direction at right angles to a path of light.

The distributions of the concentrations of a thallium ion, sodium ion, a cesium ion and a potassium ion of the sample obtained in Example 1 were measured by an electron microprobe X-ray analyzing method. The results are shown in FIG. 1 in which the ion concentrations are expressed in an arbitrary scale.

TABLE 2

| Distance from the central axis [r (mm)] | Refractive index Example 1 | Comparative Example 1 | $N_o$ sech ($\sqrt{A}$ r) calculated |
|---|---|---|---|
| 0 | 1.580 | 1.580 | 1.580 |
| 0.05 | 1.579 | 1.579 | 1.579 |
| 0.10 | 1.578 | 1.578 | 1.578 |
| 0.15 | 1.576 | 1.576 | 1.576 |
| 0.20 | 1.574 | 1.574 | 1.574 |
| 0.25 | 1.570 | 1.570 | 1.570 |
| 0.30 | 1.566 | 1.566 | 1.566 |
| 0.35 | 1.561 | 1.561 | 1.561 |
| 0.40 | 1.555 | 1.555 | 1.555 |
| 0.45 | 1.549 | 1.548 | 1.549 |
| 0.50 | 1.542 | 1.540 | 1.542 |

The results given in Table 2 show that the refractive index distribution of the treated article in Example 1 is closer to the distribution type of $N(r) = N_o \cdot$ sech ($\sqrt{A}$ r) than that of the treated article in Comparative Example 1.

It is seen from Table 2 and FIG. 1 that a cesium ion was present in a progressively decreasing concentration from the surface of the sample to a depth of about 50 microns (10% of the radius of the sample), and consequently, the refractive index in this range was higher than that obtained by the conventional method.

EXAMPLE 2 AND COMPARATIVE EXAMPLE 2

A round glass rod having a diameter of 2.0 mm produced from glass consisting of 55.9 mole% of $SiO_2$, 18.7 mole% of $B_2O_3$, 9.3 mole% of $Na_2O$, 9.3 mole% of $Tl_2O$ and 6.8 mole% of ZnO was pre-treated by maintaining it for 140 hours in a potassium nitrate bath kept at 500° C. The pre-treated glass rod was then treated for another 140 hours in a bath kept at 500° C. of a mixture of 90% by weight of potassium nitrate and 10% by weight of cesium nitrate.

For comparison, a round glass rod having a diameter of 2.0 mm produced from glass having the same composition as above was treated by a conventional method. Specifically, it was treated for 280 hours in a potassium nitrate bath kept at 500° C.

The results are shown in Table 3.

The $N_o$.sech ($\sqrt{A}$ r) in Table 3 was calculated for a constant A of 0.09 mm$^{-2}$. The distributions of the ion concentrations of the treated sample obtained in Example 2 were measured in the same way as in Example 1. The results are shown in FIG. 2.

Figure 2:
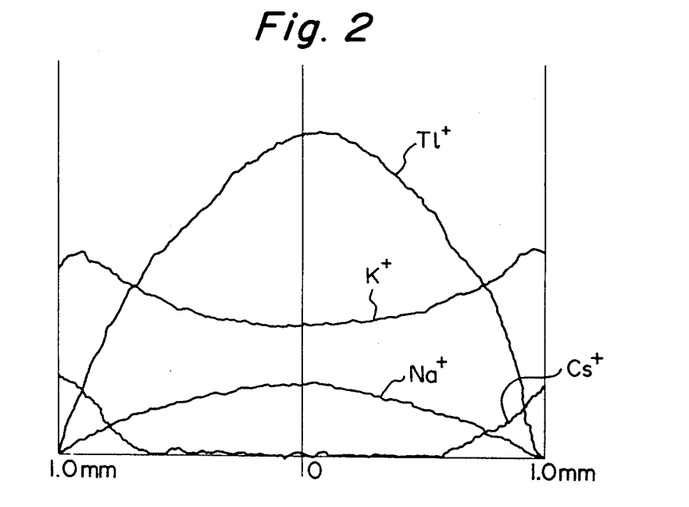

It is seen from Table 3 and FIG. 2 that in the treated article in accordance with Example 2, a cesium ion was present from the surface to a depth of about 400 microns (40% of its radius), and the refractive index of the glass rod in this range was higher than that of the treated article obtained in Comparative Example 2.

TABLE 3

| Distance from the central axis [r (mm)] | Refractive index Example 2 | Comparative Example 2 | $N_o \cdot$ sech ($\sqrt{A}$ r) calculated |
|---|---|---|---|
| 0 | 1.625 | 1.625 | 1.625 |
| 0.1 | 1.624 | 1.624 | 1.624 |
| 0.2 | 1.622 | 1.622 | 1.622 |
| 0.3 | 1.618 | 1.618 | 1.618 |
| 0.4 | 1.613 | 1.613 | 1.613 |
| 0.5 | 1.606 | 1.606 | 1.606 |
| 0.6 | 1.599 | 1.598 | 1.599 |
| 0.7 | 1.589 | 1.588 | 1.589 |
| 0.8 | 1.579 | 1.577 | 1.579 |
| 0.9 | 1.567 | 1.562 | 1.567 |
| 1.0 | 1.553 | 1.541 | 1.554 |

EXAMPLE 3 AND COMPARATIVE EXAMPLE 3

A round glass rod having a diameter of 3.0 mm produced from glass consisting of 51.0 mole% of $SiO_2$, 11.0 mole% of $B_2O_3$, 3.2 mole% of $Na_2O$, 17.8 mole% of $Tl_2O$, 12.0 mole% of ZnO and 5.0 mole% of $K_2O$ was treated for 800 hours in a bath kept at 490° C. of a mixture of 80% by weight of potassium nitrate and 20% by weight of cesium nitrate.

For comparison, the same glass rod was treated by a conventional method. Specifically, it was treated for 800 hours in a potassium nitrate bath kept at 490° C.

The results are shown in Table 4.

The calculated refractive index values in Table 4 were obtained for a constant A of 0.049 mm$^{-2}$. The distributions of the ion concentrations of the treated sample in Example 3 were measured in the same way as in Example 1, and the results are shown in FIG. 3.

Figure 3:
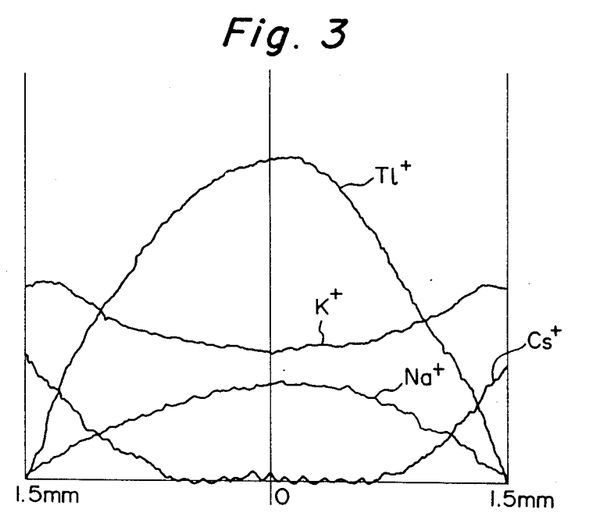

It is seen from Table 4 and FIG. 3 that a cesium ion was distributed in a progressively decreasing concentration from the surface of the treated product to a depth of about 1050 microns (70% of its radius), the refractive index of the treated product in this range was higher than that of the treated product obtained in Comparative Example 3, and that as a whole, the distribution of the refractive index was quite approximate to $N(r) = N_o$ sech ($\sqrt{A}$ r).

TABLE 4

| Distance from the central axis [r (mm)] | Refractive index Example 3 | Refractive index Comparative Example 3 | $N_o \cdot \operatorname{sech}(\sqrt{A}\, r)$ calculated |
| --- | --- | --- | --- |
| 0 | 1.675 | 1.675 | 1.675 |
| 0.15 | 1.674 | 1.674 | 1.674 |
| 0.3 | 1.671 | 1.671 | 1.671 |
| 0.45 | 1.667 | 1.667 | 1.667 |
| 0.6 | 1.660 | 1.659 | 1.660 |
| 0.75 | 1.652 | 1.651 | 1.652 |
| 0.9 | 1.642 | 1.638 | 1.642 |
| 1.05 | 1.630 | 1.621 | 1.631 |
| 1.2 | 1.617 | 1.599 | 1.618 |
| 1.35 | 1.602 | 1.572 | 1.603 |
| 1.5 | 1.585 | 1.542 | 1.587 |

EXAMPLE 4 AND COMPARATIVE EXAMPLE 4

A round glass rod having a diameter of 2.0 mm produced from glass consisting of 60.9 mole% of $SiO_2$, 18.8 mole% of $B_2O_3$, 9.2 mole% of $Na_2O$, 8.6 mole% of $Tl_2O$ and 2.6 mole% of ZnO was maintained for 180 hours in a bath kept at 530° C. of a mixture of 40% by weight of potassium nitrate and 60% by weight of cesium nitrate. Then it was taken out of the bath, and its refractive index distribution was measured. The results are shown in Table 5.

For comparison, a round glass rod having a diameter of 2.0 mm produced from glass having the same composition as above was treated by a conventional method. Specifically, it was treated for 180 hours in a bath of potassium nitrate maintained at 530° C. The refractive index distribution of the treated product is shown in Table 5.

The calculated refractive index values given in Table 5 were determined for a constant A of 0.053 mm$^{-2}$.

Figure 4:
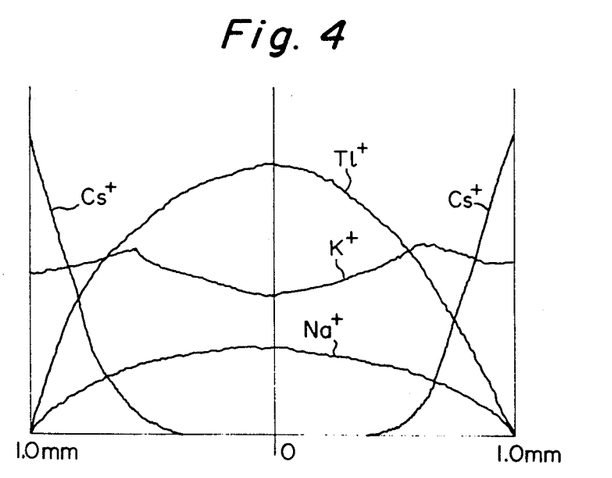

The distributions of the concentrations of the treated product obtained in Example 4 were shown in FIG. 4.

TABLE 5

| Distance from the central axis [r (mm)] | Refractive index Example 4 | Refractive index Comparative Example 4 | $N_o \cdot \operatorname{sech}(\sqrt{A}\, r)$ calculated |
| --- | --- | --- | --- |
| 0 | 1.582 | 1.582 | 1.582 |
| 0.1 | 1.581 | 1.581 | 1.581 |
| 0.2 | 1.580 | 1.580 | 1.580 |
| 0.3 | 1.578 | 1.578 | 1.578 |
| 0.4 | 1.575 | 1.573 | 1.575 |
| 0.5 | 1.572 | 1.570 | 1.572 |
| 0.6 | 1.567 | 1.564 | 1.567 |
| 0.7 | 1.562 | 1.559 | 1.562 |
| 0.8 | 1.556 | 1.551 | 1.555 |
| 0.9 | 1.549 | 1.543 | 1.549 |
| 1.0 | 1.542 | 1.532 | 1.541 |

The results given in Table 5 show that the treated product obtained in Example 4 had a refractive index distribution closer to the distribution type of $N(r) = N_o \operatorname{sech}(\sqrt{A}\, r)$ than the treated product obtained in Comparative Example 4.

It is also seen from Table 5 and FIG. 4 that a cesium ion was present distributed in a progressively decreasing concentration from the surface to a depth of about 600 microns (60% of its radius) of the sample, and the refractive index of the sample in the above range was higher than that of the treated product obtained in Comparative Example 4 and approximate to the calculated value.

EXAMPLE 5 AND COMPARATIVE EXAMPLE 5

A round glass rod having a diameter of 1.0 mm produced from glass consisting of 60.1 mole% of $SiO_2$, 13.1 mole% of $K_2O$, 5.7 mole% of $Tl_2O$ and 21.1 mole% of ZnO was pre-treated by maintaining it for 40 hours in a bath of potassium nitrate kept at 550° C. The pre-treated glass rod was subsequently treated for 60 hours in a bath kept at 550° C. of a mixture of 50% by weight of potassium nitrate and 50% by weight of cesium nitrate.

For comparison, a round glass rod having a diameter of 1.0 mm produced from glass having the same composition as above was treated by a conventional method. Specifically, it was treated for 100 hours in a bath of potassium nitrate kept at 550° C.

The results are shown in Table 6.

The calculated refractive index values shown in Table 6 were obtained for a constant A of 0.176 mm$^{-1}$.

Figure 5:
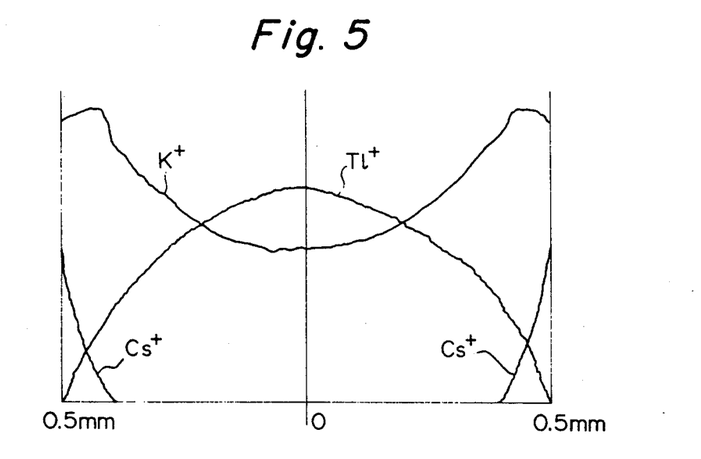

The distributions of the ion concentrations of the treated product obtained in Example 5 are shown in FIG. 5.

TABLE 6

| Distance from the central axis [r (mm)] | Refractive index Example 5 | Refractive index Comparative Example 5 | $N_o \cdot \operatorname{sech}(\sqrt{A}\, r)$ calculated |
| --- | --- | --- | --- |
| 0 | 1.616 | 1.616 | 1.616 |
| 0.05 | 1.616 | 1.616 | 1.616 |
| 0.1 | 1.615 | 1.615 | 1.615 |
| 0.15 | 1.613 | 1.613 | 1.613 |
| 0.2 | 1.610 | 1.610 | 1.610 |
| 0.25 | 1.607 | 1.607 | 1.607 |
| 0.3 | 1.603 | 1.602 | 1.603 |
| 0.35 | 1.599 | 1.597 | 1.599 |
| 0.4 | 1.594 | 1.590 | 1.593 |
| 0.45 | 1.589 | 1.582 | 1.588 |
| 0.5 | 1.582 | 1.573 | 1.581 |

It is seen from Table 6 and FIG. 5 that in the treated product obtained in Example 5, a cesium ion was distributed from the surface to a depth of 100 microns (20% of its radius) and that its refractive index was higher in this range than the treated product obtained in Comparative Example 5 and was slightly higher than the calculated value in the vicinity of its peripheral surface.

EXAMPLE 6 AND COMPARATIVE EXAMPLE 6

A round glass rod having a diameter of 3.0 mm produced from glass consisting of 61.6 mole% of $SiO_2$, 9.9 mole% of $K_2O$, 8.2 mole% of $Tl_2O$ and 20.3 mole% of ZnO was treated for 900 hours in a bath kept at 570° C. of a mixture of 20% by weight of potassium nitrate and 80% by weight of cesium nitrate.

For comparison, the same glass rod was treated by a conventional method. Specifically, it was treated for 900 hours in a bath of potassium nitrate kept at 570° C.

The results obtained together with the calculated values are shown in Table 7. The calculated values were obtained for a constant A of 0.036 mm$^{-1}$ and an $N_o$ of 1.640.

Figure 6:
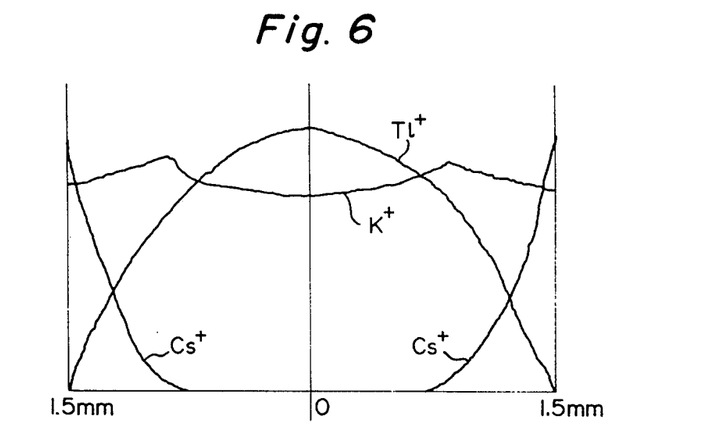

The distributions of the ion concentrations of the treated product obtained in Example 6 were measured in the same way as in Example 1, and the results are shown in FIG. 6.

TABLE 7

| Distance from the central axis [r (mm)] | Refractive index | | |
|---|---|---|---|
| | Example 6 | Comparative Example 6 | $N_0 \cdot \text{sech}(\sqrt{A}\,r)$ calculated |
| 0 | 1.640 | 1.640 | 1.640 |
| 0.15 | 1.639 | 1.639 | 1.639 |
| 0.30 | 1.637 | 1.637 | 1.637 |
| 0.45 | 1.634 | 1.634 | 1.634 |
| 0.60 | 1.630 | 1.629 | 1.629 |
| 0.75 | 1.624 | 1.623 | 1.623 |
| 0.90 | 1.618 | 1.616 | 1.616 |
| 1.05 | 1.611 | 1.607 | 1.608 |
| 1.20 | 1.603 | 1.596 | 1.598 |
| 1.35 | 1.596 | 1.584 | 1.587 |
| 1.50 | 1.590 | 1.570 | 1.576 |

It is seen from Table 7 and FIG. 6 that in the treated product obtained in Example 6, a cesium ion was distributed in a progressively decreasing concentration from its surface to a depth of about 750 microns (50% of its radius), and that its refractive index in this range is higher than the refractive index of the product treated product obtained by the conventional method and shows such a distribution that it gradually becomes higher as it aproaches the peripheral surface than an ideal distribution represented by $N(r) = N_0 \text{sech}(\sqrt{A}\,r)$.

The wavelength (P) of light path within the lens obtained in Example 6 was calculated from the following equation using a constant A of 0.036 mm$^{-2}$.

$$P = 2\pi/\sqrt{A}$$

The lens was cut to a length of 8 mm which was shorter than P/4, and its both ends were parallel polished. When parallel light rays having a wavelength of 0.63 μm were caused to fall upon its one end, a light spot having a power approximately in the form of a Gauss distribution was formed at a position 0.20 mm away from its outlet end surface. At this time, the light spot diameter (the widening of the power of 1/e$^2$) at this focus was 2.2 μm, and the numerical aperture (NA) of the lens was 0.40.

The outlet end of the lens was processed in a convex shape with a radius of curvature of 9 mm [ξ=3do=3×3] (do: the diameter of the lens=3 mm). By this processing, the light spot diameter at the focus could be decreased to 1.5 μm, and NA could be increased to 0.45.

When the outlet end of the treated product (lens) obtained in Comparative Example 6 was processed in a convex shape with a radius of curvature of 9 mm, the light spot diameter at the focus was 2.56 μm and NA was 0.40.

What we claim is:

1. A converging light transmitting glass body whose refractive index gradually changes from its central portion to its surface in a direction transverse to a path of light in such a way that when in an arbitrary phantom cross-section taken at right angles to a path of light, the following relation is established with regard to meridional rays $$N(r) \geqq N_0 \text{sech}\left(\sqrt{A}\,r\right)$$

wherein A is a refractive index distribution constant, $N_0$ is a refractive index at the central point of the cross-section, and N(r) is a refractive index at a distance r from the central point, said glass body containing at least thallium, potassium and cesium cations constituting modifying oxides of the glass, the thallium and the potassium cations showing concentration changes of converse gradients from its central portion toward its peripheral surface, and the cesium cation showing no substantial concentration change at the central portion of the glass body but showing a substantial continuous concentration change outwardly thereof toward its peripheral surface.

2. The light transmitting glass body of claim 1 wherein the concentration of the cesium cation changes in a region corresponding to a distance from the peripheral surface of the glass body of from 10 to 70 if the distance between the peripheral surface to the center of the light transmitting body is taken as 100.

3. The light transmitting glass body of claim 1 or 2 wherein the concentration of the thallium cation increases from the surface toward the center, the concentration of the potassium cation decreases from the surface toward the center, and the concentration of the cesium cation decreases from the surface toward the center.

4. The light transmitting glass body of claim 1 or 2 wherein the following relation is established with respect to helical rays $$N(r) \geqq N_0(1 + A \cdot r^2)^{-1}$$

wherein N(r), $N_0$, A and r are as defined in claim 1.

5. A process for producing a light transmitting glass body whose refractive index gradually changes from its central portion to its surface in a direction transverse to a path of light in such a way that when in an arbitrary phantom cross-section taken at right angles to a path of light, the following relation is established with regard to meridional rays $$N(r) \geqq N_0 \text{sech}\left(\sqrt{A}\,r\right)$$

wherein A is a refractive index distribution constant, $N_0$ is a refractive index at the central point of the cross-section, and N(r) is a refractive index at a distance r from the central point, said glass body containing at least thallium, potassium and cesium cations constituting modifying oxides of the glass, the thallium and the potassium cations showing concentration changes of converse gradients from its central portion toward its peripheral surface, and the cesium cation showing no substantial concentration change at the central portion of the glass body but showing a substantial continuous concentration change outwardly thereof toward its peripheral surface which comprises contacting a glass body containing a modifying oxide of thallium cation with an ion source containing potassium cation capable of constituting a modifying oxide of the glass body to produce a pre-produced glass body in which the thallium cation and the potassium cation show substantially continuous concentration changes of converse gradients from the central portion to the peripheral portion of the glass body, and then contacting the pre-produced glass body with an ion source containing cesium cation capable of constituting a modifying oxide of the glass body to produce a glass body in which the cesium cation does not show a concentration change in the central portion but shows a substantially continuously changing concentration toward the peripheral portion.

6. A process for producing a light transmitting glass body whose refractive index gradually changes from its central portion to its surface in a direction transverse to a path of light in such a way that when in an arbitrary phantom cross-section taken at right angles to a path of light, the following relation is established with regard to meridional rays $$N(r) \cong N_o \operatorname{sech}\left(\sqrt{A}\, r\right)$$

wherein A is a refractive index distribution constant, $N_o$ is a refractive index distribution at the central point of the cross-section, and $N(r)$ is a refractive index at a distance r from the central point, said glass body containing at least thallium, potassium and cesium cations constituting modifying oxides of the glass, the thallium and the potassium cations showing concentration changes of converse gradients from its central portion toward its peripheral surface, and the cesium cation showing no substantial concentration change at the central portion of the glass body but showing a substantial continuous concentration change outwardly thereof toward its peripheral surface which comprises contacting a glass body containing a modifying oxide of thallium cation with an ion source containing potassium and cesium cation capable of constituting modifying oxides of the glass to produce a glass body in which the thallium and the potassium cations show concentration changes of converse gradients from its central portion toward its peripheral surface, and the cesium cation shows no substantial concentration change at the central portion of the glass body but shows a substantially continuous concentration change outwardly thereof toward its peripheral surface.

* * * * *